US011150921B2

(12) United States Patent
Berlingerio et al.

(10) Patent No.: US 11,150,921 B2
(45) Date of Patent: Oct. 19, 2021

(54) DATA VISUALIZATIONS SELECTION

(71) Applicant: International Business Machines Corporation, Armonk, NY (US)

(72) Inventors: Michele Berlingerio, Dublin (IE); Francesco Calabrese, Dublin (IE); Giusy Di Lorenzo, Dublin (IE); Marco Luca Sbodio, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 14/842,263

(22) Filed: Sep. 1, 2015

(65) Prior Publication Data
US 2017/0060367 A1 Mar. 2, 2017

(51) Int. Cl.
*G06F 9/451* (2018.01)
*G06T 11/20* (2006.01)

(52) U.S. Cl.
CPC ............ *G06F 9/453* (2018.02); *G06T 11/206* (2013.01)

(58) Field of Classification Search
CPC .... G06F 3/0481; G06F 3/0482; G06F 3/0483; G06F 3/04817; G06F 9/4443; G06F 9/4446; G06F 3/04895; G06F 3/011; G06F 3/0489; G06F 9/453; H04N 5/44543; G06T 11/206
See application file for complete search history.

(56) References Cited

U.S. PATENT DOCUMENTS

| | | | | |
|---|---|---|---|---|
| 6,128,613 A | * | 10/2000 | Wong | G06F 16/313 707/738 |
| 6,973,459 B1 | * | 12/2005 | Yarmus | G06F 16/24544 707/778 |
| 7,350,191 B1 | * | 3/2008 | Kompella | G06F 9/44526 717/108 |
| 7,478,106 B2 | * | 1/2009 | Heckerman | G06Q 10/00 |
| 7,606,835 B2 | | 10/2009 | Laaser et al. | |

(Continued)

OTHER PUBLICATIONS

Toledo, A., et al., "Personalized Recommendation in Interactive Visual Analysis of Stacked Graphs", ISRN Artificial Intelligence, Nov. 2, 2011, pp. 1-12, vol. 2012.

(Continued)

*Primary Examiner* — Arpan P. Savla
*Assistant Examiner* — Erik V Stitt
(74) *Attorney, Agent, or Firm* — Fleit Intellectual Property Law; Jon Gibbons

(57) ABSTRACT

A system, computer program product, and method is described to propose a method to automatically suggest a visualization providing the best insight for a given dataset, by maximizing an utility function computed on properties of the input data, and previously used visualizations by the same user and for the same data. In one example method for recommending a data visualization in a computer system includes receiving at least one input dataset and at least one set of previous visualizations. A utility function is accessed. A set of potential visualizations is computed using the input dataset and the set of previous visualizations. A recommendation is selected for a proposed visualization from the set of potential visualizations by maximizing a value of the utility function, whereby the proposed visualization is a new visualization not in the set of previous visualizations.

20 Claims, 9 Drawing Sheets

(56) References Cited

U.S. PATENT DOCUMENTS

| | | | | |
|---|---|---|---|---|
| 8,458,715 | B1* | 6/2013 | Khosla | G06F 9/50 |
| | | | | 718/104 |
| 8,677,235 | B2* | 3/2014 | Chronister | G06F 16/904 |
| | | | | 715/253 |
| 9,158,994 | B2* | 10/2015 | Schreer | H04N 13/128 |
| 9,424,318 | B2* | 8/2016 | Anand | G06F 16/24578 |
| 9,864,953 | B2* | 1/2018 | Adams | G06N 7/005 |
| 10,135,765 | B1* | 11/2018 | Skyrm | H04L 65/601 |
| 2002/0042786 | A1* | 4/2002 | Scarborough | G06Q 10/063 |
| | | | | 706/21 |
| 2002/0118192 | A1* | 8/2002 | Couckuyt | G06F 3/0486 |
| | | | | 345/440 |
| 2004/0181543 | A1* | 9/2004 | Wu | G06F 16/26 |
| 2005/0149504 | A1* | 7/2005 | Ratnaparkhi | G06F 16/3346 |
| 2007/0061611 | A1* | 3/2007 | Mackinlay | G06F 17/30554 |
| | | | | 714/5.1 |
| 2008/0243770 | A1* | 10/2008 | Aasman | G06F 16/28 |
| 2009/0150411 | A1 | 6/2009 | Laaser et al. | |
| 2009/0287673 | A1* | 11/2009 | Chronister | G06F 17/30994 |
| 2009/0300547 | A1* | 12/2009 | Bates | G06F 16/954 |
| | | | | 715/825 |
| 2010/0049686 | A1* | 2/2010 | Gotz | G06Q 30/00 |
| | | | | 706/47 |
| 2010/0138368 | A1* | 6/2010 | Stundner | G06N 20/00 |
| | | | | 706/12 |
| 2012/0078804 | A1* | 3/2012 | Scarborough | G06Q 10/1053 |
| | | | | 705/321 |
| 2013/0071837 | A1* | 3/2013 | Winters-Hilt | C12Q 1/6869 |
| | | | | 435/6.11 |
| 2013/0121562 | A1* | 5/2013 | Barnum | G06K 9/00201 |
| | | | | 382/154 |
| 2014/0071138 | A1* | 3/2014 | Gibson | G06T 11/206 |
| | | | | 345/501 |
| 2014/0304106 | A1* | 10/2014 | Dahan | G06Q 30/0631 |
| | | | | 705/26.7 |
| 2014/0379612 | A1* | 12/2014 | Mulvaney | G06Q 40/06 |
| | | | | 705/36 R |
| 2017/0328032 | A1* | 11/2017 | Matsuo | G06T 7/55 |
| 2018/0067998 | A1* | 3/2018 | Sherman | G06F 16/248 |

OTHER PUBLICATIONS

Tableau, "Meet Tableau 9.0", http://www.tableausoftware.com/, Last visited on Aug. 19, 2015, pp. 1-3.

Wikipedia, "Tableau Software", http://en.wikipedia.org/wiki/Tableau_Software, Last visited on Aug. 21, 2015, pp. 1-5.

Tableau, "Tableau Business Intelligence", http://www.tableausoftware.com/business-intelligence, Last visited on Aug. 24, 2015, pp. 1-8.

Tableau, "Which Chart or graph is right for you?", http://www.tableausoftware.com/learn/whitepapers/which-chart-or graph-is-right-for-you, Last visited on Aug. 21, 2015, pp. 1-6.

Koop, D., et al., "VisComplete: Automating Suggestions for Visualization Pipelines", IEEE Transactions on Visualization and Computer Graphics, Oct. 2008, vol. 14, No. 6, pp. 1-8.

SAS, "Working With Automatic Charts", http://support.sas.com/documentation/cdl/en/vaug/65747/HTML/default/viewer.htm#n1xa25dv4fiyz6n1etsfkbz75ai0.htm, Last visited on Aug. 31, 2015, pp. 1-2.

Microstrategy, "Creating Visualizations", http://www2.microstrategy.com/producthelp/AnalyticsEnterprise/AnalyticsDesktop/WebUser/WebHelp/Lang_1033/index.html#page/MicroStrategy%2520Analytics%2520Desktop%2520User%2520Guide/CreatingDashboards.04.05.html, Last visited on Aug. 31, 2015, pp. 1-3.

SAS, "Data Visualization Techniques", http://www.sas.com, Last visited on Sep. 1, 2015, pp. 1-2.

* cited by examiner

| # | text | | | | | | |
|---|---|---|---|---|---|---|---|
| 1 | sama kan la sem last un? | 9901 | en | 188 | 0 | 1 Fri Sep 09 05:25:35 +0000 2011 | 0 | 174 |
| 2 | ooglegay oughtbay agatzay | 4 | en | 0 | 0 | 0 Fri Sep 09 05:25:36 +0000 2011 | 0 | 15 |
| 3 | RT lyay onday\ eedhay ayay anmay | 8667 | en | 222 | 0 | 0 Fri Sep 09 05:25:36 +0000 2011 | 18 | 152 |
| 4 | owhay asway apedray | 1306 | en | 57 | 100 | 1 Fri Sep 09 05:25:36 +0000 2011 | 0 | 50 |
| 5 | tay isyay ayay onglay | 12186 | en | 151 | 0 | 0 Fri Sep 09 05:25:37 +0000 2011 | 193 | 205 |
| 6 | RT ctedday ybay ethay | 1476 | pt | 356 | 0 | 1 Fri Sep 09 05:25:37 +0000 2011 | 0 | 879 |
| 7 | RT ityay ashay ayay o | 1666 | en | 17 | 0 | 0 Fri Sep 09 05:25:37 +0000 2011 | 20 | 0 |
| 8 | usingyay ontentCay erehay | 6140 | ja | 24 | 0 | 1 Fri Sep 09 05:25:37 +0000 2011 | 0 | 62 |
| 9 | ontentcay ofyay ayay agepay | 599 | en | 9 | 0 | 0 Fri Sep 09 05:25:38 +0000 2011 | 1 | 0 |
| 10 | establishedyay acttay | 1155 | en | 65 | 0 | 0 Fri Sep 09 05:25:38 +0000 2011 | 1 | 97 |
| 11 | esktopday ublishingpay | 3400 | en | 161 | 0 | 1 Fri Sep 09 05:25:38 +0000 2011 | 5 | 74 |
| 12 | agepay | 9804 | en | 258 | 0 | 0 Fri Sep 09 05:25:39 +0000 2011 | 0 | 195 |
| 13 | RT ebway agepay edit | 21730 | en | 471 | 0 | 1 Fri Sep 09 05:25:39 +0000 2011 | 0 | 434 |
| 14 | oremay-oryay | 1159 | en | 2448 | 100 | 0 Fri Sep 09 05:25:40 +0000 2011 | 35 | 2670 |
| 15 | istributionday ofyay | 44298 | en | 133 | 0 | 1 Fri Sep 09 05:25:41 +0000 2011 | 2 | 63 |
| 16 | RTanyMay esktopday ublishi | 3300 | pt | 172 | 0 | 1 Fri Sep 09 05:25:42 +0000 2011 | 15 | 137 |
| 17 | ownay | 240 | pt | 22 | 0 | 2 Fri Sep 09 05:25:42 +0000 2011 | 0 | 65 |
| 18 | ackagespay andyay ebway | 388 | es | 104 | 0 | 2 Fri Sep 09 05:25:42 +0000 2011 | 75 | 46 |
| 19 | tay isyay ayay onglay | 46779 | en | 798 | 1 | 1 Fri Sep 09 05:25:42 +0000 2011 | 0 | 588 |
| 20 | itsyay ayoutlay, | 3504 | en | 73 | 0 | 0 Fri Sep 09 05:25:42 +0000 2011 | 5 | 72 |
| 21 | RT opposedyay otay usingyay 'onte | 937 | en | 64 | 100 | 1 Fri Sep 09 05:25:43 +0000 2011 | 15 | 70 |
| 22 | RT lyay onday\ eedhay ayay anmay | 29673 | en | 166 | 0 | 1 Fri Sep 09 05:25:43 +0000 2011 | 0 | 119 |
| 23 | owhay asway apedray | 6337 | es | 266 | 0 | 1 Fri Sep 09 05:25:43 +0000 2011 | 3 | 750 |
| 24 | tay isyay ayay onglay | 84728 | ja | 5232 | 1 | 1 Fri Sep 09 05:25:44 +0000 2011 | 2497 | 3747 |
| 25 | ctedday ybay ethay | 6488 | en | 205 | 0 | 1 Fri Sep 09 05:25:44 +0000 2011 | 5 | 282 |
| 26 | ityay ashay ayay o | 950 | en | 1918 | 1 | 1 Fri Sep 09 05:25:44 +0000 2011 | 4 | 174 |
| 27 | usingyay ontentCay erehay | 61 | es | 8 | 100 | 1 Fri Sep 09 05:25:45 +0000 2011 | 4 | 30 |
| 28 | eadableray ontentcay ofy | 623 | en | 87 | 0 | 0 Fri Sep 09 05:25:46 +0000 2011 | 6 | 67 |
| 29 | RT atthay ityay as | 16900 | en | 178 | 0 | 1 Fri Sep 09 05:25:46 +0000 2011 | 45 | 191 |
| 30 | ontentCay erehay, ontentcay | 955 | en | 63 | 0 | 0 Fri Sep 09 05:25:47 +0000 2011 | 0 | 35 |

DATA VISUALIZATIONS SELECTION

BACKGROUND

The present invention relates to data visualization systems and, more particularly, relates to methods and apparatus for recommending alternate visualization types based on user behavior.

Interactive visual dialog systems aid users in investigating large and complex datasets. There is a large class of users for whom existing tools are of limited value. Many business users, for example, typically have extensive domain knowledge but are not visualization or computer experts. As part of their daily responsibilities, however, they perform situational analysis tasks over large amounts of data for which appropriate visualization can be of great benefit. It is difficult for this class of users to create visualization that is tailored to the user's context.

When the employed visualization is not well-suited to the user's information needs, more time may be spent than necessary interacting with the visualization. As a result, it may significantly slow down the user's task performance.

Data analysts often use a sequence of several visualizations for the same data, to extract and present different insights.

However, given a set of previously used visualizations, it is difficult to choose the next visualization, such that it will maximize the added knowledge provided by it, with respect to the previously used visualizations.

In fact, the next visualization may be redundant with the previous ones, or its added value may be marginal if compared with other possible or potential visualizations.

SUMMARY

Disclosed is a novel system, computer program product, and method to automatically suggest a visualization providing the best insight for a given dataset, by maximizing an utility function computed on properties of the input data, and previously used visualizations by the same user and for the same data.

In a further example, the method for recommending a data visualization in a computer system includes receiving at least one input dataset and at least one set of previous visualizations. The set of previous visualizations can be an empty set. A utility function is accessed. A set of potential visualizations is computed using the input dataset and the set of previous visualizations. A recommendation is selected for a proposed visualization from the set of potential visualizations by maximizing a value of the utility function, whereby the proposed visualization is a new visualization not in the set of previous visualizations.

In one example the maximizing a value of the utility function includes any of maximization of 1) an identity function, 2) information entropy measured on the dataset visualized in the proposed visualization and in the previous visualizations; 3) information variance measured on the dataset visualized in the proposed visualization and in the previous visualizations; and 4) a minimum description length computed on additional bits required to encode the proposed visualization, with respect to the previous visualizations, among all the possible or potential visualizations.

In another example, the next visualization is a new visualization when one or more of characteristics of the visualization have changed including 1) a type of chart for the visualization, 2) a subset of the dataset used in the visualization, and 3) a viewing property of the visualization.

In yet another example, the utility function uses intrinsic properties of the input dataset for computing the set of potential visualizations. The intrinsic properties may include one or more of statistical properties, results of data mining, results from machine learning tasks, and semantics.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 is a microblogging dataset used for recommending data visualization with a utility function;

DETAILED DESCRIPTION

Figure 1:
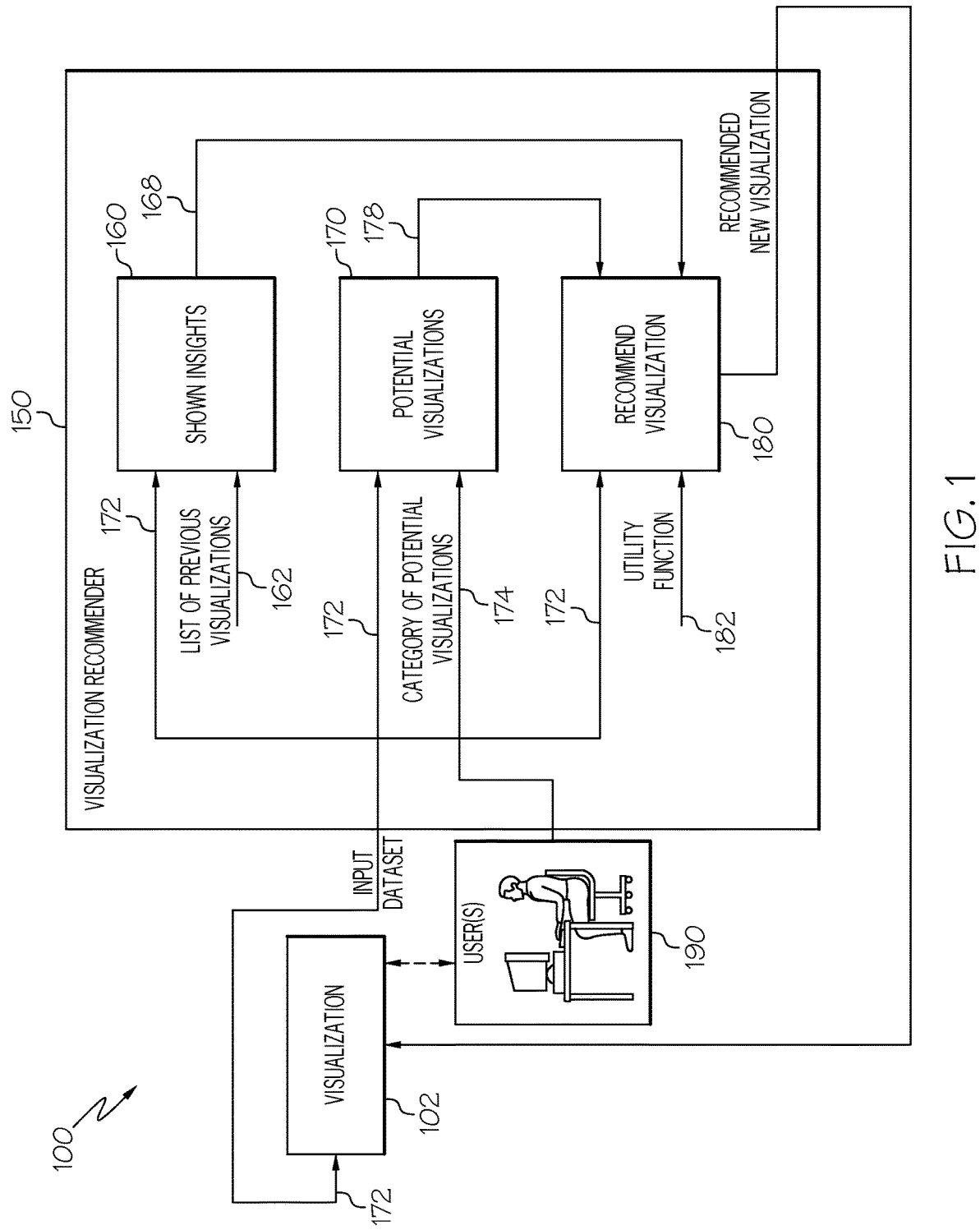
FIG. 1 is a block diagram illustrating use of utility function along with previous visualizations for recommending a new data visualization.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The presently claimed invention is related to data visualization. Data analysts often use a sequence of several visualizations for the same dataset, to extract and present different insights. However, given a set of previously used visualizations, it is difficult to choose the next visualization, such that it will maximize the added knowledge provided by it, with respect to the previously used visualizations. In fact, the next visualization may be redundant with the previous ones, or its added value may be marginal if compared with other possible or potential visualizations.

The inventors have discovered a method and system to automatically suggest a visualization providing the best insight for a given dataset, by maximizing an utility function computed on properties of the input dataset, and previously used visualizations by the same user and for the same dataset.

NON-LIMITING DEFINITIONS

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "characteristics of visualization" or "attributes of visualization" means a type of chart or type of graph such as a bar chart, histogram, scatterplot, network, or a different subset of a dataset, the number of axes or number dimensions, the units of measure or metrics. The "characteristics of visualization" may include viewing property as further described below.

The term "chart" is used to mean a graphical representation of at least part of a dataset, also known as a graph or diagram. Typically the dataset is represented by symbols such as bars in a bar chart, lines in a line chart, or slices in a pie chart.

The term "dataset" is used to mean a collection of data used to create one or more visualization using charts and graphs or a viewing property of the visualization.

The term "intrinsic property" is used to mean a property of the dataset itself which is independent of the amount of data.

The phrase "maximizing a value of a utility function" is used to mean maximization one or more of 1) information entropy measured on the dataset visualized in the proposed visualization and in the previous visualizations; 2) information variance measured on the dataset visualized in the proposed visualization and in the previous visualizations; and 3) a minimum description length (MDL) computed on additional bits required to encode the proposed visualization, with respect to the previous visualizations, among all the possible or potential visualizations.

The phrase "minimum description length" is a technique introduced by Jorma Rissanen in 1978 from algorithmic information theory which dictates that the best hypothesis for a given dataset is the one that leads to the largest compression of the data.

The term "utility function" is a function that maps an event or values of one or more variables onto a real number intuitively representing some "cost" associated with the event. Examples of a utility function include but are not limited to maximization of information entropy measured on a dataset, maximization of information variance measured on a dataset, and a maximization of a minimum description length computer on additional bits required to encode the proposed visualization. The "utility function" also known as "objective function" that has been maximized or optimized for a given result.

The term "viewing property" is used to mean any visual pre-attentive attribute including size, orientation, color, level of zoom, aggregation of data, or a combination thereof of how the data from a dataset that has been previously selected is presented to a user.

Visual Analytics

Visual analytics is a multidisciplinary field that includes the following focus areas: (i) analytical reasoning techniques, (ii) visual representations and interaction techniques, (iii) data representations and transformations, (iv) techniques to support production, presentation, and dissemination of analytical results. See Thomas, J. J.; Cook, K. A., "A visual analytics agenda" Computer Graphics and Applications, IEEE, vol. 26, no. 1, pp. 10,13, Jan.-Feb. 2006. doi: 10.1109/MCG.2006.5.

In the past years, a number of visual representation techniques have been developed, and applied in different use cases, helping "to advance the state of the science to enable analysts to detect the expected and discover the unexpected from massive and dynamic information streams and databases consisting of data of multiple types and from multiple sources, even though the data are often conflicting and incomplete." Ibid.

Currently, the selection of the best sequence of visualizations to represent a given input dataset, is still an almost completely manual task performed by data visualization experts/analysts/artists.

The presently claimed invention defines a system and method to automatically suggest new optimal visualizations for a given input dataset based on the (i) properties of an input dataset, (ii) the visualizations used previously for the same data, and (iii) an input utility function.

Operating Environment

FIG. 1 is a block diagram 100 illustrating use of utility function along with previous visualizations are used for recommending a new data visualization. As shown in FIG. 1, the visual recommendation system 100 comprises a visualization component 102 and a visualization recommender 150. The visualization recommender is broken down into three distinct blocks of ShownInsights 160, Potential Visualization 170, and Recommend Visualization 180 as further described below. A user 190 reviews the data visualizations component 102 and provides selection 174, for example a category of potential visualization, to the potential visualizations 170. Other user input 174 including characteristics of visualization and viewing properties may also be received by the potential visualizer from a user 190. The input data set 172 is feed to the visualization block 102 and also to the other three distinct blocks of ShownInsights 160, Potential Visualization 170, and Recommend Visualization 180. The ShownInsights 160 uses as an additional input to the input data set 172 a set of previous visualization 162. The output 168 of the ShownInsights 160 is an input to the Recommend Visualization 180 as shown. The output of the Potential Visualization 178 is also routed as an input to the Recommend Visualization 180. Based on the input data set 172, the utility function 182, the output of the ShownInsights 168, output of Potential Visualizations 178 a recommendation is selected for a proposed visualization from the set of potential visualizations is made. As further described below this recommendation is based on maximizing a value of the utility function. The proposed visualization is a new visualization not in the set of previous visualizations is presented back to the visualization block 102.

Data Visualization Selection

An example of implementing each ShownInsights 160, Potential Visualization 170, and Recommend Visualization 180 of FIG. 1 is now described.

Shown Insights 160 prevIns=shownInsights(dataset, previous visualizations)

This function returns summarized measures of shown Insights, including for example . . .
which columns have been visualized
which charts have been used
which aggregations were performed Potential Visualizations 170 potViz=potentialVisualizations(dataset, previous visualizations)

This function returns a list of potential new visualizations (meaningful for the associated data types), with associated insights (columns, charts, aggregation)

Recommend Visualization 180 reccViz=recommendVisualization(prevIns,potViz,UtilityFunction)

Given the set of potential visualizations potViz, this function returns the visualization v in potViz that maximizes the utility function
e.g. Which viz will show the greater number of new columns
SIMPLE EMBODIMENT
for i=1:length (potViz)
utility(i)=UtilityFunction(potViz(i), prevIns)
end
RETURN potViz(Arg max(utility))

Overall Flow Example

Figure 2:
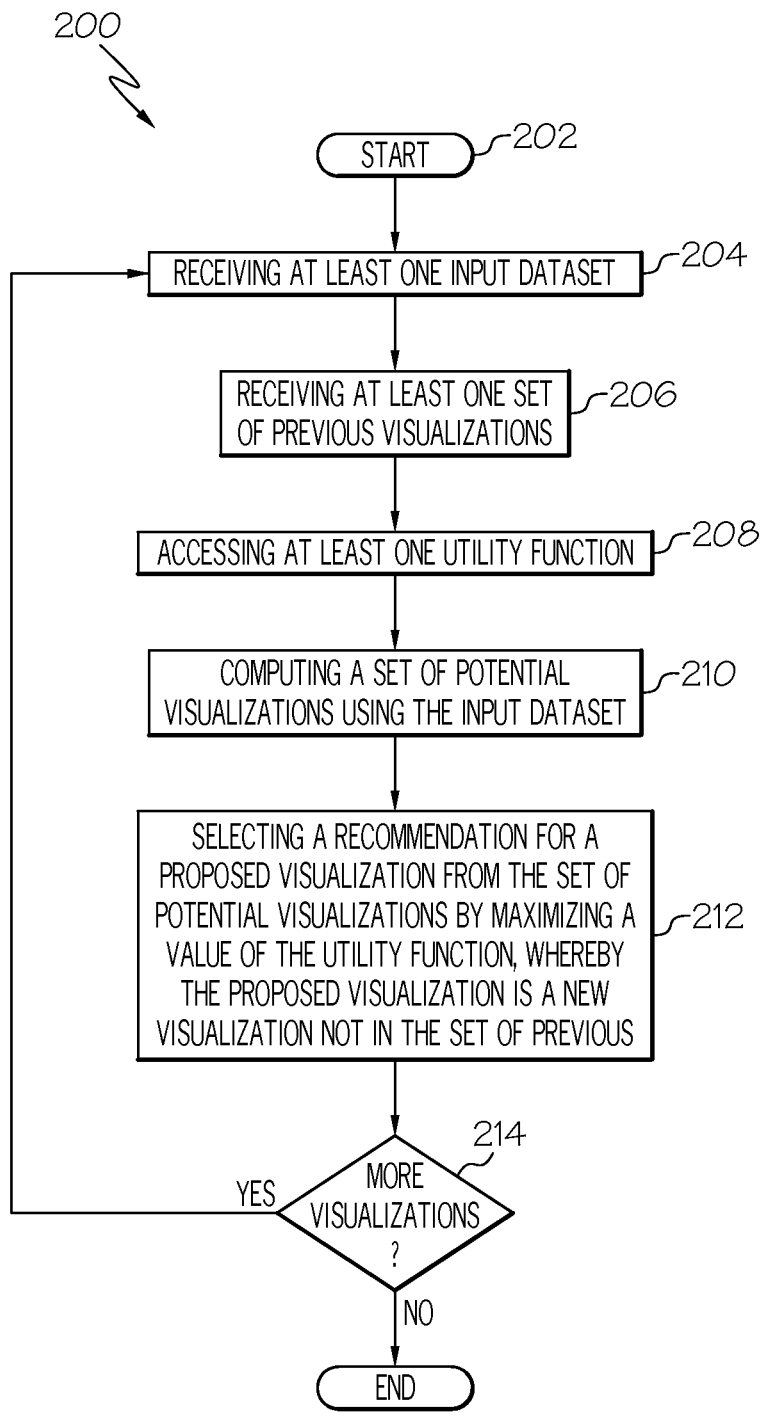
FIG. 2 is a flow diagram illustrating a method of recommending data visualization in a computer system.

FIG. 2 is a flow diagram 200 illustrating a method of recommending data visualization in a computer system. The process begins in step 200 and immediately proceed to step 204 one or more input datasets are received. Next in step 206, at least one set of previously visualizations is received. The set can be an empty set. In step 208, a utility function is accessed. A set of potential visualizations is computed, in step 210 using the input dataset and the set of previous visualizations. In step 212, a recommendation is selected for a proposed visualization from the set of potential visualizations by maximizing a value of the utility function, whereby the proposed visualization is a new visualization not in the set of previous visualizations. A test is made in step 216 to determine if the user wants more visualizations. If the answer is yes, the process return to step 204, otherwise the process terminates in step 216.

Data Visualization Recommendation Test Examples

The following are two examples of how a recommendation for a data visualization is computed.

Overall Procedure

Procedure:
Select INPUTS
Choose dataset (e.g. made of 8 columns).
Select "previously used visualization" (e.g. I already visualized columns X and Y)
Choose "utility function".
Select category "possible visualizations" (e.g. I want to visualize a new 2D or 3D plot).

The method computes utility function over all potential new visualizations (taking into account data and previously used visualizations).

The method OUTPUTs the optimal new visualization (e.g. 2D plot of columns Z and W).

Note that for clarity of the presentation of these examples, the focus is on the visualization novelty in terms of data being visualized, not in terms of which type of visualization (e.g. bar chart of scatter plot) or properties of the visualization (e.g. color, aggregation). Adding this additional features to the utility function is contemplated within the true scope of the present invention. Moreover, in this example, ShownInsights 160 only returns which columns have been used in the previous charts.

Microblogging Test Example

Turning now to FIG. 3, shown in a microblogging dataset 300 used for recommending data visualization with a utility function. Specifically in this microblogging dataset consists of two sample datasets:

Data1 dataset: microblogs from 2011-09-08 (~15000 rows)

Figure 4:
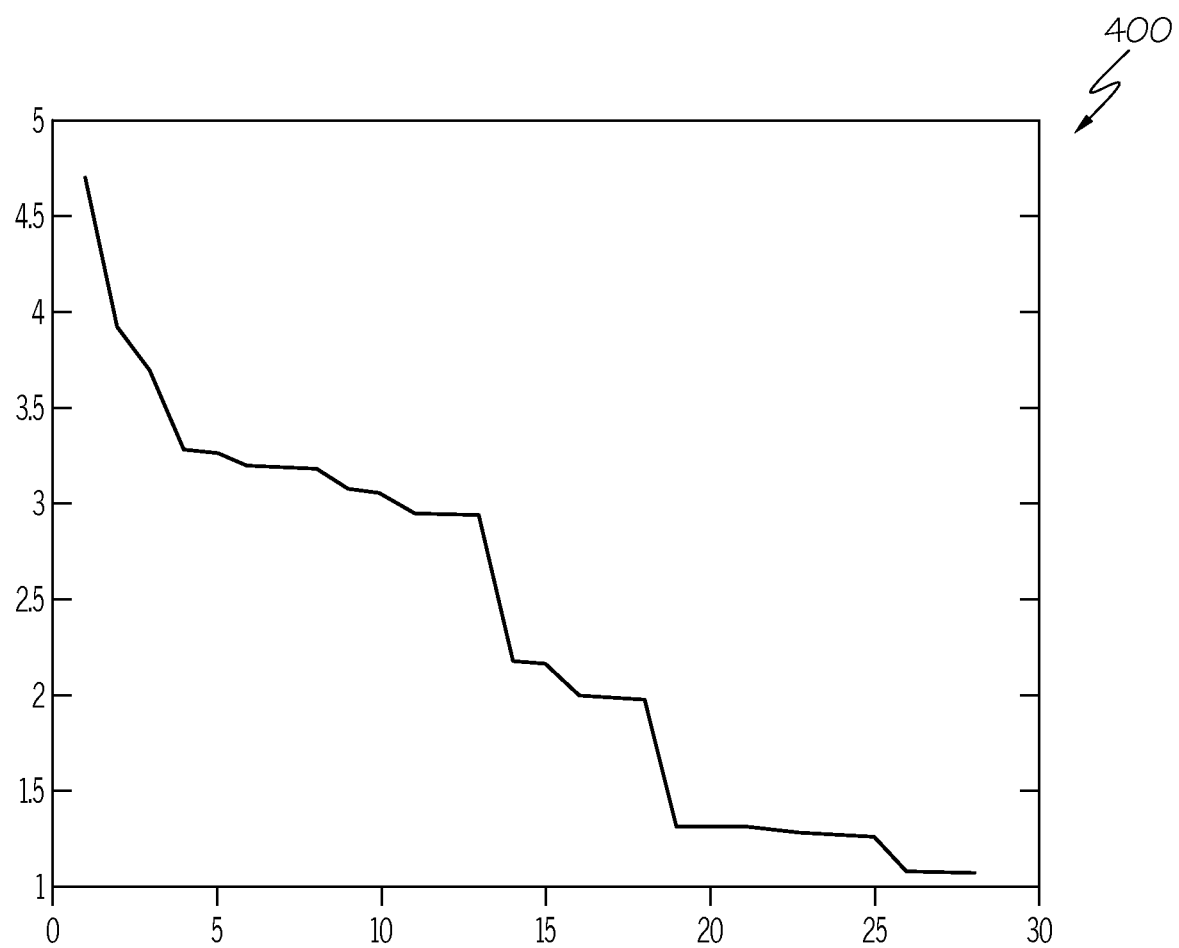
FIG. 4 is a graph illustrating a maximization of a value from a utility function where the value is a maximization of information entropy measured on the microblogging dataset of FIG. 3.

Data2 dataset: microblogs from 2013-04-29 (~1500 rows) for each message, nine columns: text, # messages by the same user, language, # followers of the user, # remessage, # mentions, # hashtags, posting time, # favorites FIG. 4 is a graph 400 illustrating a maximization of a value from a utility function where the value is a maximization of information entropy measured on the set of potential visualizations for the microblogging dataset of FIG. 3. An embodiment of the method has been implemented and tested on real data. In this example, two different utility functions have been implemented and tested:

Utility1: ENTROPY of data computed on matrix of columns {previously seen visualization, possible visualization}

Utility2: VARIANCE of data computed as sum of variances for each column in matrix of columns {previously seen visualization, possible visualization}

Note that a non-numeric data is converted to bytes and used as numeric data.

Turning now to FIG. 4, shown is a graph illustrating a maximization of a value from a utility function where the value is a maximization of information entropy measured on the set of potential visualizations for the microblogging Data1 dataset of FIG. 3.

First test with selected parameters
INPUT:
Data: Data1
Utility: U1 (Entropy)
Previously seen visualization: columns (message, *remessage) visualized
Potential visualization: visualizations with 2 columns (e.g. 2D viz)
OUTPUT:
Method selected columns
(# followers, # friends) to be visualized with entropy: 4.66
All other visualization had lower entropy.
Only 2 visualization (#19 and #20) had equal entropy, all other entropy values were distinct.

Figure 5:
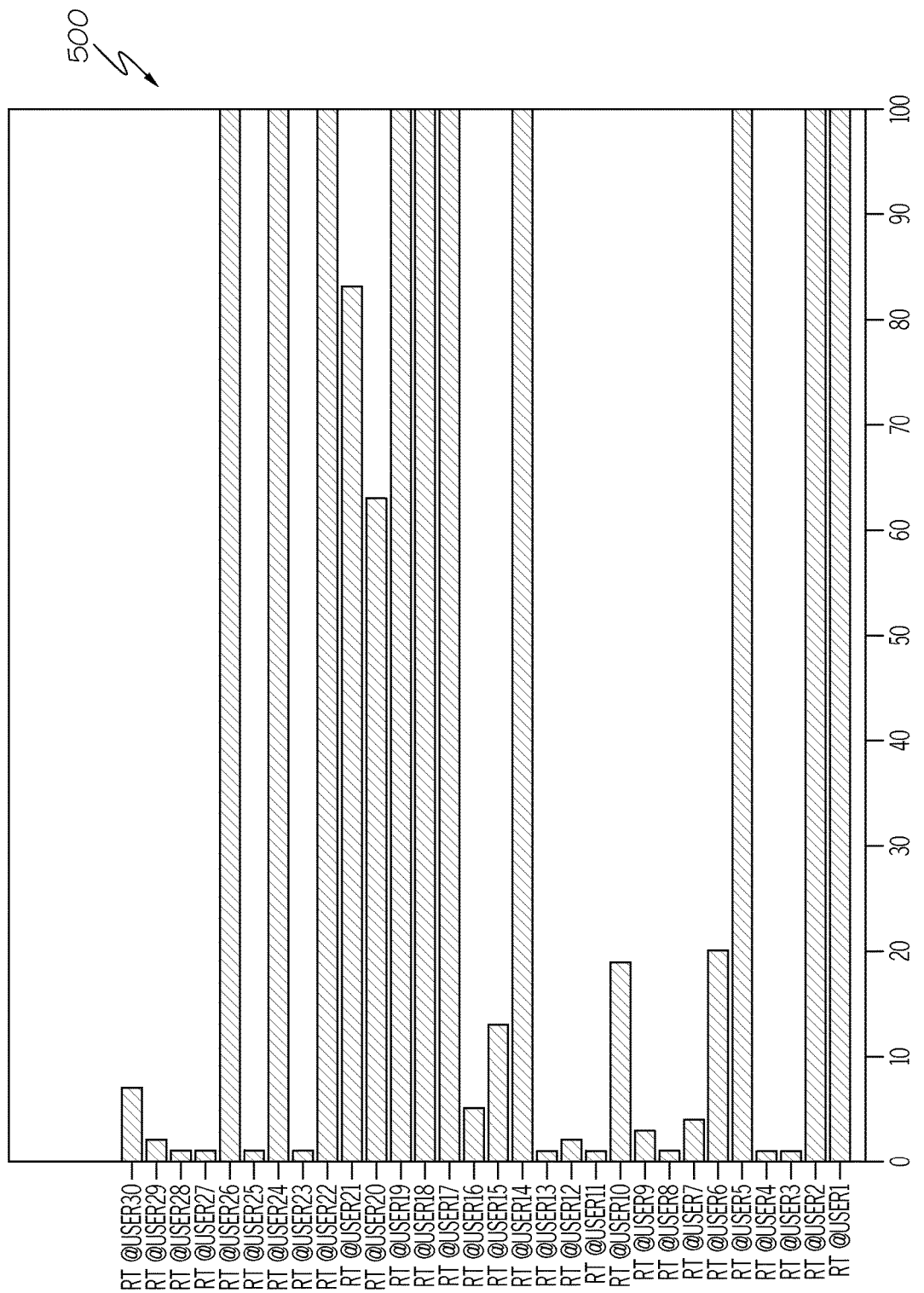
FIG. 5 is a graph illustrating a previous visualization of the microblogging dataset of FIG. 3.
Figure 6:
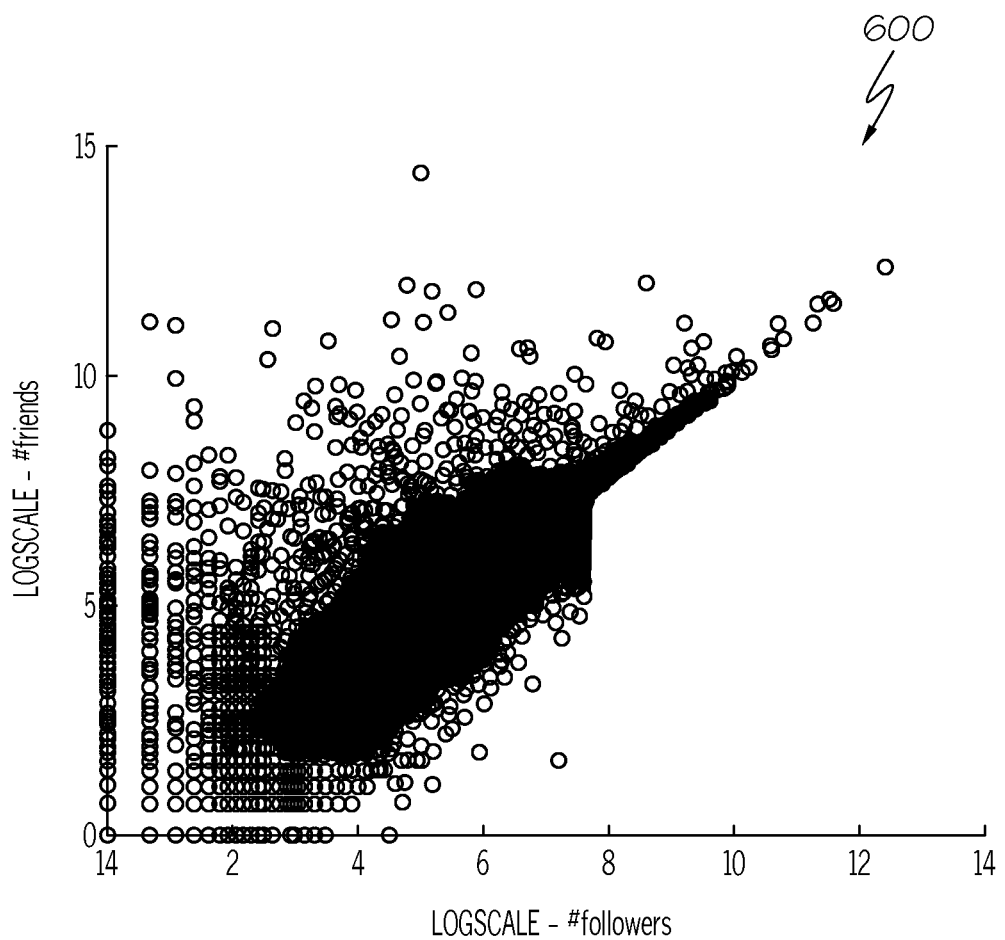
FIG. 6 is a graph illustrating selecting a recommendation for a proposed visualization from the set of potential visualizations by maximization of information entropy measured on the microblogging dataset of FIG. 3.

Referring to FIG. 5 is a graph 500 illustrating a previous visualization of the microblogging Data1 dataset of FIG. 3. FIG. 4 is a graph 400 illustrating a maximization of a value from a utility function where the value is a maximization of information entropy measured on the microblogging Data1 dataset of FIG. 3;

FIG. 6 is a graph 600 illustrating selecting a recommendation for a proposed visualization from the set of potential visualizations by maximization of information entropy measured on the microblogging Data1 dataset of FIG. 3. The proposed visualization is a new visualization not in the set of previous visualizations. On the same data, the method suggests a very different view of the data, offering an unseen perspective.

Figure 7:
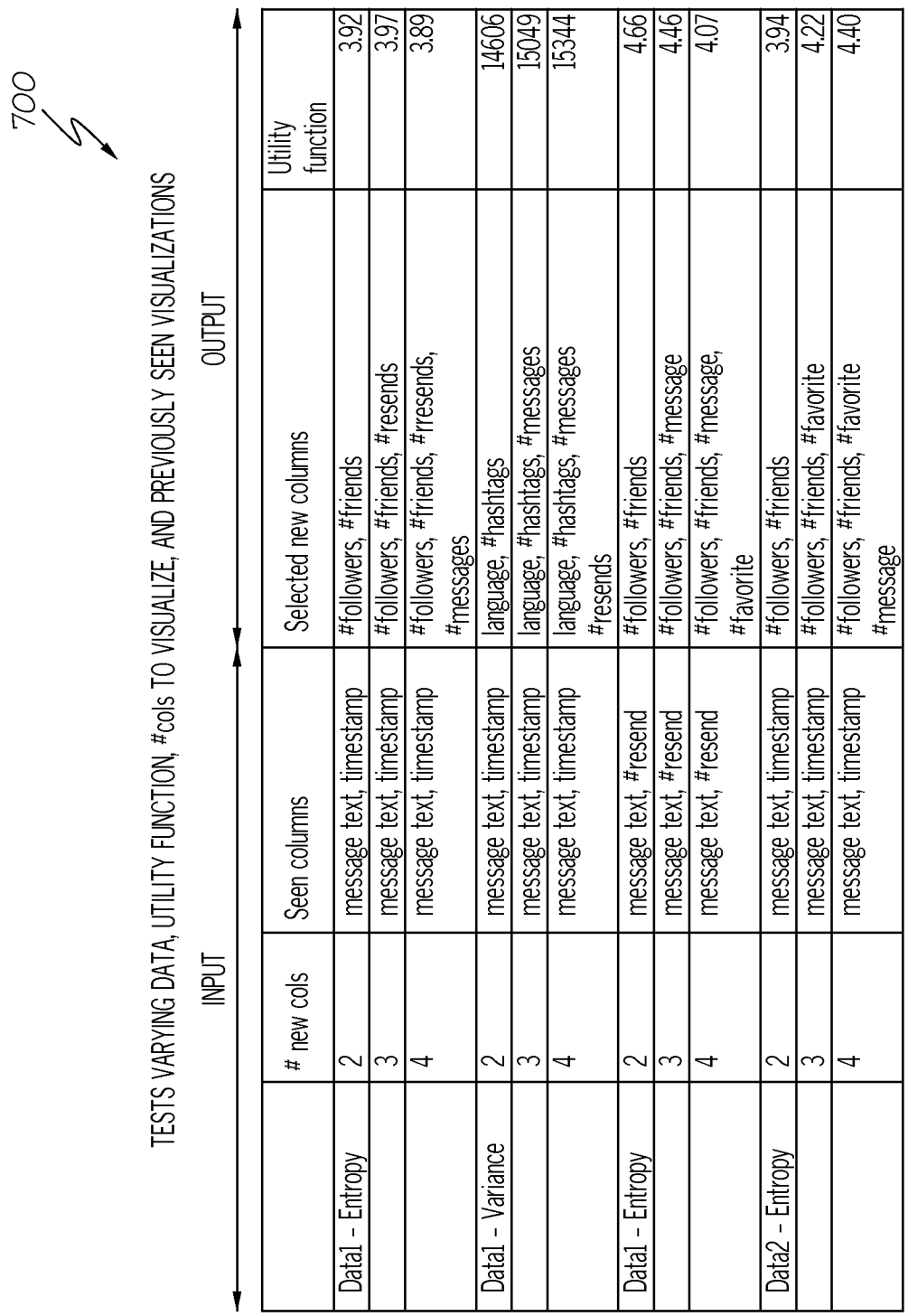
FIG. 7 is a chart illustrating two different utility function types, entropy and variance on the microblogging dataset of FIG. 3 and the results of the utility function.

FIG. 7 is a chart 700 illustrating two different utility function types, entropy and variance on the two different datasets and what is the output from the utility function. In this example microblogging Data1 dataset and Data2 dataset of FIG. 3 are used. This is shown in left-most column. The results of the utility function are shown in the right-most column. The output of the utility function varies with varying datasets, varying utility functions, the number of columns to visualize, and previously seen visualizations used.

Figure 8:
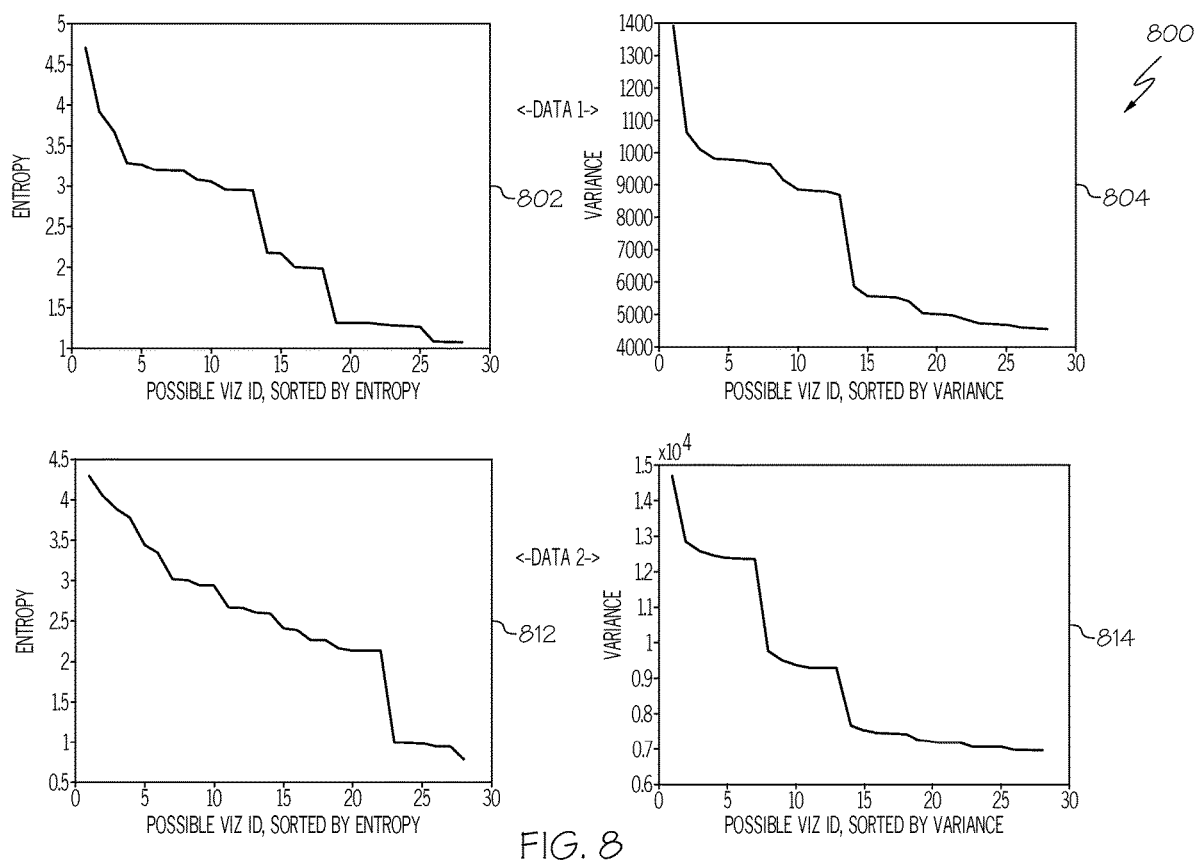
FIG. 8 is a series of charts corresponding to FIG. 7 illustrating the two different examples of maximization of a value from a utility function entropy, and variance on two different subsets of the dataset of the microblogging dataset of FIG. 3.

FIG. 8 is a series of charts 802, 804, 812, 814 corresponding to FIG. 7 illustrating the two different examples of maximization of a value from a utility function entropy, and variance on two different subsets of the dataset of the microblogging dataset of FIG. 3. Note there is only one maximum value in each of the charts. This demonstrates the discriminative power of the utility functions for entropy and variance. This again also shows how the value from the utility function changes using different s data1 dataset and date2 dataset along with the set of previous visualizations i.e. the number of columns to add.

Overall Results of Test Examples

The inventors make the following observations based on the tests from FIGS. 3-8 above. To begin the utility function are discriminative enough as shown for both entropy and variance above. Further, the utility functions can recommend different visualization as function of the data and not only its format. The results for FIG. 8 show it changed on Data1 dataset and Data2 dataset.

Previous visualizations are taken into account, for example with computing the utility function. There are a finite number of possible or potential visualizations for the datasets Data1 dataset and Data2 dataset tested. Constraints can be added to make the number of possible visualization finite.

Generalized Computing Environment

Figure 9:
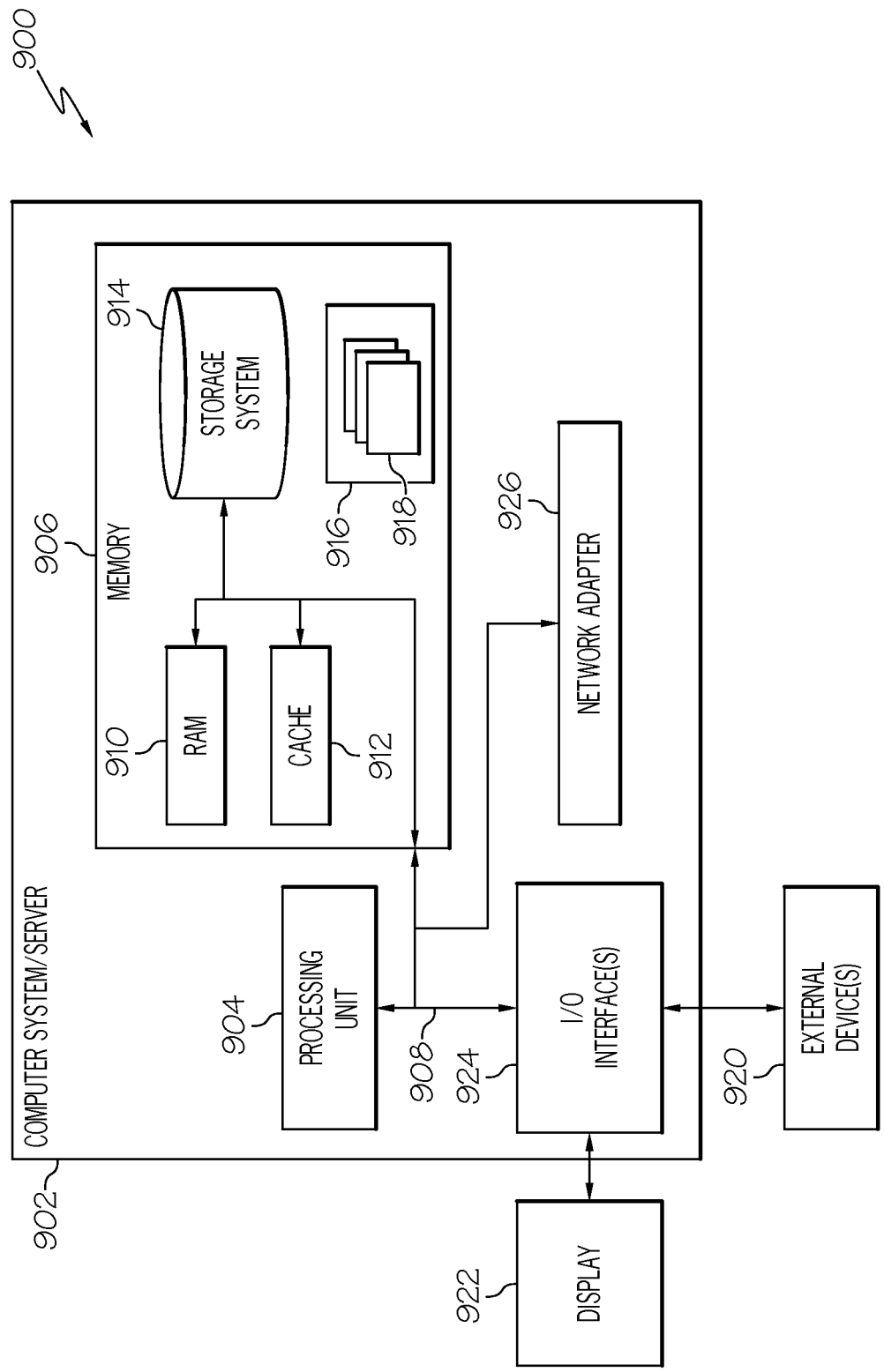
FIG. 9 illustrates one example of a processing node for operating the block diagram of FIG. 1 of a utility function along with previous visualizations are used for recommending a new data visualization.

FIG. 9 illustrates one example of a processing node 900 for operating the block diagram of FIG. 1 of a utility function along with previous visualizations are used for recommending a new data visualization and is not intended to suggest any limitation as to the scope of use or functionality of embodiments of the invention described herein. Regardless, the computing node 900 is capable of being implemented and/or performing any of the functionality set forth hereinabove.

In computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus 908 that couples various system components including system memory 906 to processor 904.

Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906, in one embodiment, implements the box diagram of FIG. 1 and the flow of FIG. 2. The system memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of various embodiments of the invention.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the invention as described herein.

Computer system/server 902 may also communicate with one or more external devices 1020 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Non-Limiting Examples

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for recommending a data visualization in a computer system, the method comprising:
    receiving at least one input dataset;
    receiving at least one set of a plurality previous visualizations including columns that have been visualized and aggregations performed on the columns that have been visualized;
    selecting, by a user, at least one utility function which is a function that maps values of one or more variables onto a real number;
    computing a set of potential visualizations using the input dataset and the set of the plurality previous visualizations with the columns that have been visualized and the aggregations performed on the columns that have been visualized;
    selecting a recommendation for a set of proposed visualizations from the set of potential visualizations by using as inputs:
    the set of potential visualizations, and
    the at least one set of the plurality previous visualizations with the columns that have been visualized and the aggregations performed on the columns that have been visualized, to maximize a value of the utility function, whereby the set of proposed visualizations is a new visualization not in the set of the plurality previous visualizations with respect to the data being visualized and displaying on a display the recommendation for the set of proposed visualizations on a display, wherein the selecting the recommendation for the proposed visualization from the set of potential visualizations by maximizing the value of the utility function based on the recommendation with a highest number of new columns not in the set of the plurality previous visualizations.

2. The method of claim 1, wherein the maximizing the value of the utility function is a maximization of a minimum description length computed on additional bits required to encode the set of proposed visualizations, with respect to the set of the plurality previous visualizations, among all the possible visualizations.

3. The method of claim 1, wherein a next visualization is a new visualization when one or more of characteristics of the visualization have changed including:
    a type of chart for the visualization,
    a subset of the dataset used in the visualization, and
    a viewing property of the visualization.

4. The method of claim 1, wherein the utility function uses one or more of:
    a number of dimensions in the set of the plurality previous visualizations,
    a type of graphs in the set of the plurality previous visualizations, and
    a type of viewing property in the set of the plurality previous visualizations.

5. The method of claim 1, wherein the utility function uses intrinsic properties of the input dataset for computing the set of potential visualizations.

6. The method of claim 5, wherein the intrinsic properties include results from machine learning tasks.

7. A system for recommending a data visualization, the system comprising:
    a memory;
    a processor communicatively coupled to the memory, where the processor is configured to perform;
    receiving at least one input dataset;
    receiving at least one set of a plurality previous visualizations including columns that have been visualized and aggregations performed on the columns that have been visualized;
    selecting, by a user, at least one utility function which is a function that maps values of one or more variables onto a real number;
    computing a set of potential visualizations using the input dataset and the set of the plurality previous visualizations with the columns that have been visualized and the aggregations performed on the columns that have been visualized;
    selecting a recommendation for a set of proposed visualizations from the set of potential visualizations by using as inputs:
    the set of potential visualizations, and
    the at least one set of the plurality previous visualizations with the columns that have been visualized and the aggregations performed on the columns that have been visualized, to maximize a value of the utility function, whereby the set of proposed visualizations is a new visualization not in the set of the plurality previous visualizations with respect to the data being visualized and displaying on a display the recommendation for the set of proposed visualizations on a display, wherein the selecting the recommendation for the proposed visualization from the set of potential visualizations by maximizing the value of the utility function based on the recommendation with a highest number of new columns not in the set of the plurality previous visualizations.

8. The system of claim 7, wherein the maximizing the value of the utility function is a maximization of a minimum description length computed on additional bits required to encode the set of proposed visualizations, with respect to the set of the plurality previous visualizations, among all the possible visualizations.

9. The system of claim 7, wherein the next visualization is a new visualization when one or more of characteristics of the visualization have changed including:
    a type of chart for the visualization,
    a subset of the dataset used in the visualization, and
    a viewing property of the visualization;
    wherein the viewing property of the visualization includes level of zoom.

10. The system of claim 7, wherein the utility function uses intrinsic properties of the input dataset for computing the set of potential visualizations, wherein the intrinsic properties include results from machine learning tasks.

11. The system of claim 7, wherein the selecting a recommendation for a proposed visualization from the set of potential visualizations by using as inputs the set of the plurality previous visualizations with charts that have been visualized and wherein the maximizing the value of the utility function and the utility function is at least one of a maximization of
    information entropy measured on the dataset visualized in the set of proposed visualizations and in the set of the plurality previous visualizations, and
    information variance measured on the dataset visualized in the set of proposed visualizations and in the set of the plurality previous visualizations.

12. The system of claim 7, wherein the utility function uses one or more of:
    a number of dimensions in the set of the plurality previous visualizations, a type of graphs in the set of the plurality previous visualizations, and a type of viewing property in the set of the plurality previous visualizations.

13. A non-transitory computer program product for recommending a data visualization, the computer program product comprising a computer readable storage medium having computer readable program code embodied therewith, the computer readable program code configured to perform:

receiving at least one input dataset;

receiving at least one set of a plurality previous visualizations including columns that have been visualized and aggregations performed on the columns that have been visualized;

selecting, by a user, at least one utility function which is a function that maps values of one or more variables onto a real number;

computing a set of potential visualizations using the input dataset and the set of the plurality previous visualizations with the columns that have been visualized and the aggregations performed on the columns that have been visualized;

selecting a recommendation for a set of proposed visualizations from the set of potential visualizations by using as inputs:

the set of potential visualizations, and the at least one set of the plurality previous visualizations with the columns that have been visualized and the aggregations performed on the columns that have been visualized, to maximize a value of the utility function, whereby the set of proposed visualizations is a new visualization not in the set of the plurality previous visualizations with respect to the data being visualized and displaying on a display the recommendation for the set of proposed visualizations on a display, wherein the selecting the recommendation for the proposed visualization from the set of potential visualizations by maximizing the value of the utility function based on the recommendation with a highest number of new columns not in the set of the plurality previous visualizations.

14. The non-transitory computer program product of claim 13, wherein the maximizing the value of the utility function is a maximization of a minimum description length computed on additional bits required to encode the set of proposed visualizations, with respect to the set of the plurality previous visualizations, among all the possible visualizations.

15. The non-transitory computer program product of claim 13, wherein the next visualization is a new visualization when one or more of characteristics of the visualization have changed including:

a type of chart for the visualization, a subset of the dataset used in the visualization, and a viewing property of the visualization;

wherein the viewing property of the visualization includes level of zoom.

16. The non-transitory computer program product of claim 13, wherein the utility function uses intrinsic properties of the input dataset for computing the set of potential visualizations, wherein the intrinsic properties include results from machine learning tasks.

17. The method of claim 1, wherein the selecting the recommendation for the proposed visualization from the set of potential visualizations by maximizing the value of the utility function by converting any non-numeric data in the input dataset to bytes, which are numeric data.

18. The method of claim 1, wherein the selecting a recommendation for a proposed visualization from the set of potential visualizations by using as inputs the set of the plurality previous visualizations with charts that have been visualized and wherein the maximizing the value of the utility function and the utility function is at least one of a maximization of information entropy measured on the dataset visualized in the set of proposed visualizations and in the set of the plurality previous visualizations, and information variance measured on the dataset visualized in the set of proposed visualizations and in the set of the plurality previous visualizations.

19. The non-transitory computer program product of claim 13, wherein the selecting a recommendation for a proposed visualization from the set of potential visualizations by using as inputs the set of the plurality previous visualizations with charts that have been visualized and wherein the maximizing the value of the utility function and the utility function is at least one of a maximization of information entropy measured on the dataset visualized in the set of proposed visualizations and in the set of the plurality previous visualizations, and information variance measured on the dataset visualized in the set of proposed visualizations and in the set of the plurality previous visualizations.

20. The non-transitory computer program product of claim 13, wherein the utility function uses one or more of:

a number of dimensions in the set of the plurality previous visualizations, a type of graphs in the set of the plurality previous visualizations, and a type of viewing property in the set of the plurality previous visualizations.

* * * * *